(12) United States Patent
Goldstein et al.

(10) Patent No.: US 7,231,147 B1
(45) Date of Patent: Jun. 12, 2007

(54) SYSTEM AND METHOD OF WAVELENGTH ADD/DROP MULTIPLEXING HAVING CLIENT CONFIGURABILITY

(75) Inventors: Evan L. Goldstein, Princeton, NJ (US); Lih-Yuan Lin, Little Silver, NJ (US); Chuan Pu, Middletown, NJ (US); Robert William Tkach, Little Silver, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/188,412

(22) Filed: Jul. 25, 2005

Related U.S. Application Data (63) Continuation of application No. 09/722,955, filed on Nov. 27, 2000, now Pat. No. 6,928,244.

(60) Provisional application No. 60/204,452, filed on May 16, 2000, provisional application No. 60/172,732, filed on Dec. 20, 1999.

(51) Int. Cl.
*H04J 14/00* (2006.01)
*G02B 6/26* (2006.01)
*G02B 6/42* (2006.01)

(52) U.S. Cl. .............. 398/45; 398/83; 385/17; 385/18

(58) Field of Classification Search .......... 398/45, 398/51, 54, 83; 385/17, 18, 16
See application file for complete search history.

(56) References Cited

U.S. PATENT DOCUMENTS

| | | | | |
|---|---|---|---|---|
| 5,581,643 A | * | 12/1996 | Wu ............. | 385/17 |
| 6,519,060 B1 | * | 2/2003 | Liu ............. | 398/49 |
| 6,928,244 B1 | * | 8/2005 | Goldstein et al. ..... | 398/45 |

* cited by examiner

*Primary Examiner*—M. R. Sedighian (57) ABSTRACT

An optical carrier drop/add transmission system and method for adding a signal to multiplexed input optical signals conveyed by an optical multiplex input line. The multiplexed input optical signals are demultiplexed to provide isolated input optical signals to an optical switch matrix comprising switches in an array of lines and column, the isolated input optical signals being inputted in a direction parallel to a line of switches in the optical switch matrix. The added optical signal is input in a direction parallel to a column in the optical switch matrix. An output line is selected and the switch that is on the column on which the added optical signal is inputted and on the selected output line is switched.

3 Claims, 9 Drawing Sheets

SYSTEM AND METHOD OF WAVELENGTH ADD/DROP MULTIPLEXING HAVING CLIENT CONFIGURABILITY

This is a continuation of U.S. patent application Ser. No. 09/722,955 filed Nov. 27, 2000 now U.S. Pat. No. 6,928,244 which claimed the benefits of U.S. Provisional Application No. 60/172,732 filed on Dec. 20, 1999 and which also claimed the benefits of U.S. Provisional Application No. 60/204,452 filed on May 16, 2000.

BACKGROUND OF THE INVENTION

1. Field of Invention

This invention relates to optical communication. More particularly, this invention relates to systems and methods using optical switches for adding and dropping channels from an optical transmission medium.

2. Description of Related Art

In current optical communication systems, multiple channels are multiplexed onto a single optical transmission medium using multiplexing techniques, such as wavelength-division-multiplexing (WDM). WDM can combine a plurality of communication channels, in the form of discrete wavelengths, onto a single optical fiber. As multiplexing techniques improve, an increasing number of channels are being transmitted on a single optical fiber or group of optical fibers. As the number of channels increase, so too does the need for an ability to add and/or drop a portion of the channels to and/or from the transmission medium.

Current communication systems can use an opto-electronic regeneration technique to add and drop channels from a transmission system. With such a technique, in order to receive or transmit data on the optical network using WDM, a node of the network can include at least one optical sensor that receives the optical signal at one or more wavelengths. The optical sensor can include an optical-electrical converter that can convert the optical signal to electrical signals corresponding to the received optical signals. Adding and/or dropping of the signals can then be performed electronically by processing the electrical signals in the electrical domain. The resulting electrical signal can then be modulated onto the network using an electro-optical converter. Such Optical-Electrical-Optical (OEO) conversion can be very complex, costly and time consuming.

Additionally, optical wavelength add/drop multiplexers (OADM) can be used in WDM transmission systems. Currently, it has been well recognized that OADMs are needed to avoid the complex and costly OEO conversions. However, currently available OADMs are generally fixed. In other words, a given incoming channel (wavelength) is only associated with a fixed add/drop port. Such a device lacks "client-configurability" and therefore severely limits the selection of which channels to add/drop for a client.

Therefore, there exists a need for a device to add and drop channels from a transmission medium that can be readily configured according to the needs of a client.

SUMMARY OF THE INVENTION

The invention provides an optical switch matrix device and methods that selectively add and drop channels from an optical communication medium. The optical switch matrix can receive an input signal from an optical medium, such as an optical fiber cable. The input signal can include numerous input channels, for example a plurality of channels each having a different wavelength. The optical switch matrix can also receive an add signal which can include numerous add channels for different clients; each add channel can replace an input channel of the input signal that is dropped.

Depending on the configuration of the optical switch matrix, any channels of the input optical signal can be dropped from the communication medium to any of the clients. The dropped channels can be received and processed by a receiver. Further, any channels from the add signal can be added to the communication medium. The added channels along with the remaining channels of the input signal can then be outputted and transmitted on the communication medium. Different from fixed optical wavelength add/drop multiplexers (OADMs) described in the related art, the invented optical switch matrix can be configured to allow each client to access any of the input channels, therefore offering client-configurability to the network.

The optical switch matrix can be a device that operates on the optical channels in the optical domain. For example, the optical switch matrix can be a device, such as a micro electrical mechanical system (MEMs), having an array of micromirrors that are rotatably mounted on a substrate. The micromirrors may be selectively positioned to interact with passing light, so as to redirect light beams between ports of the optical switch matrix. Accordingly, the optical switch matrix can add/drop channels to/from an optical communication medium.

Alternatively, or in conjunction with the MEMs, the optical switch matrix can be a device such as a matrix of switches utilizing bubble technology. As an optical channel passes through the optical switch matrix, bubble switches can be selectively activated causing the channel to be redirected between ports of the optical switch matrix. Accordingly, the optical switch matrix can add/drop channels to/from an optical communication medium.

These and other features and advantages of this invention are described in or are apparent from the following detailed description of the system and method according to exemplary embodiments of this invention.

BRIEF DESCRIPTION OF THE DRAWINGS

The benefits of the present invention will be readily appreciated and understood from consideration of the following detailed description of exemplary embodiments of this invention, when taken together with the accompanying drawings, in which.

DETAILED DESCRIPTION OF PREFERRED EMBODIMENTS

Figure 1:
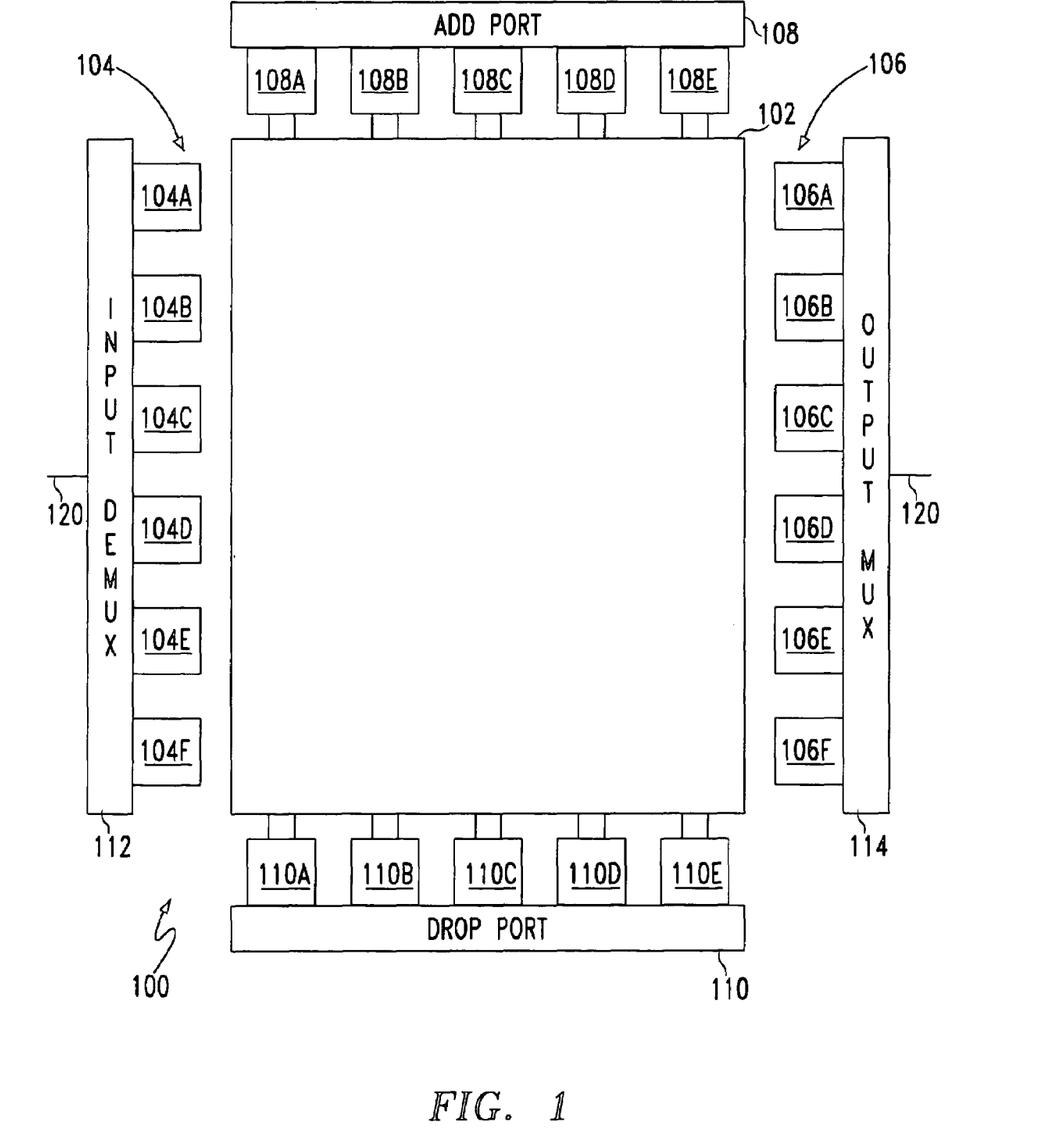
FIG. 1 is an exemplary block diagram of a wavelength add-drop device in accordance with the present invention.

FIG. 1 shows an optical switch matrix system 100 for selectively adding and dropping channels from a transmission medium 120. The system 100 includes an optical switch matrix 102 having four ports: input port 104, output port 106, add port 108 and drop port 110. The input port 104 is optically coupled to a demultiplexer 112 for receiving input channels 104a–104f from the transmission medium 120. The output port 106 is optically coupled to a multiplexer 114 for transmitting optical channels 106a–106f onto the transmission medium 120. The add port 108 is optically coupled with the optical switch matrix 102 for inputting added channels 108a–108e that are connected to different clients. The drop port 110 is optically coupled with the optical switch matrix 102 for transmitting drop channels 110a–110e, possibly for further processing.

Both the multiplexer 114 and the demultiplexer 112 are optically coupled with the transmission medium 120. The transmission medium 120 can include any structure that allows for the transmission of optical communication signals, such as an optical fiber. The optical communication signals can further include a plurality of channels that are simultaneously transmitted along the communication medium 120. For example, numerous channels having discrete wavelengths can be combined onto a single optical transmission medium using wavelength-division-multiplexing (WDM).

The demultiplexer 112 is a device that is capable of optically dividing input signals received on the transmission medium 120 into a plurality of channels 104a–104f. Once the input channel is divided, the input channels 104a–104f are transmitted to the optical switch matrix 102. As described above, the channels can travel along the transmission medium 120 on different wavelengths. Additionally, the channels of the input signal can be combined on the transmission medium 120 according to any well known communication technique, such as TDMA, CDMA and the like. Any technique that allows multiple channels to be transmitted across the transmission medium 120 and separated by the demultiplexer 112 can be used without departing from the spirit and scope of the present invention.

The multiplexer 114 is a device that is capable of optically combining the output channels 106a–106f received from the optical switch matrix 102 into an output signal that is then transmitted on the transmission medium 120. As described above, the numerous output channels 106a–106f can travel along the transmission medium as an output signal in accordance with any known or later developed transmission technique without departing from the spirit and scope of the present invention.

The add port 108 is a device that is capable of receiving channels 108a–108e from different clients, and then transmitting the added channels 108a–108e to the optical switch matrix 102. Data sources for the added channels 108a–108e can be generated by a plurality of light sources, such as tunable laser diodes, included in the add port 108. Each of the light sources can be adjusted to emit a channel having a specific wavelength. The light sources of the add port 108 can further operate in accordance with instructions received from a controller (not shown) in order to selectively output an added channel of a specific wavelength. For example, added channels 108a–108e can each be transmitted on different wavelengths $\lambda_a$–$\lambda_f$, corresponding to the wavelengths of the input channels.

The drop port 110 is a device that is capable of receiving drop channels 110a–110e from the optical switch matrix 102. Each of the channels can be of various wavelengths. The drop port 110 can then output any of the drop channels to a processor (not shown) for further processing.

The optical switch matrix 102 is a device that is capable of redirecting optical signals passing through the optical switch matrix 102. In this manner, a portion of the input channels 104a–104f can pass through the optical switch matrix 102 to the output channels 106a–106f without any substantial interference. In other words, these channels are permitted to pass nearly unabated through the optical switch matrix 102 and continue to travel on the transmission medium 120.

Alternatively, a portion of the input channels can be selectively redirected to a drop channel 110a–110e of the drop port 110 as the inputted channels 104a–104f pass through the optical switch matrix 102. In a similar manner, added channels 108a–108e can be selectively redirected to output channels 106a–106f of the output port 106 for which the corresponding input channel has been dropped as the added channels pass through the optical switch matrix 102. According to this technique, input channels can be removed/dropped and new channels can be added to the transmission medium 120.

The optical switch matrix 102 can include an array of switches that can be in either an active or inactive state. In an active state, the switch is able to redirect a light beam or channel passing in close proximity to the switch. In an inactive state, the switch allows a light beam or channel to pass without incident.

As an example of operation, assume that the optical switch matrix 102 includes at least N×M matrix of switches that are initially in the inactive position. Further assume that the transmission medium 120 is transmitting an input signal having 6 channels (A–F). In the initial state, the input signal can be received by the demultiplexer 112. The demultiplexer 112 operates on the input signal to optically separate the input signal into input channels 104a–104f. The input channels 104a–104f are then transmitted to the optical switch network 102.

In the initial state of the switch matrix 102, where all of the optical switches are in the inactive state, the input channels 104a–104f are permitted to pass through the optical switch matrix to the output channel 106a–106f without being acted upon. Accordingly, the output channels 106a–106f, corresponding to the input channels 104a–104f are transmitted to the multiplexer 114. The multiplexer 114 then optically operates on the output channels 106a–106f in order to combine the output channels 106a–106f into an output signal, and then transmit the output signal back onto the transmission medium 120.

During the course of operation, assume that it has now become desirable to replace input channel 104c with an added channel 108b. Accordingly, as the input channels 104a–104f are transmitted through the optical switch matrix 102, one or more optical switches in the path of input channel 104c could be switched to an active state whereby the optical switch can redirect the light beam corresponding to input channel 104c to the specified drop port 110, such as dropped signal 110a. Furthermore, the add port 108 can begin transmitting an added signal 108b into the optical switch matrix 102 and an optical switch in the path of added channel 108b could be switched to an active state, and thereby redirect the added channel 108b to output channel 106c of the output port 106.

Accordingly, the multiplexer would then receive the input channel 104a on output channel 106a, the input channel 104b on the output channel 106b, the added channel 108b on the output channel 106c, the input channel 104d on the output channel 106d, the input channel 104e on the output channel 106e and the input channel 104f on the output channel 106f. The output channels 106a–106f would then be combined by the multiplexer 114 and transmitted as an output signal across the transmission medium 120. In this manner, a channel of the input signal, 104c, has been replaced (dropped) during the addition of the added channel 108b.

As is to be understood, the switches of the optical switch matrix 220 can be changed at any time during operation to add or drop channels to or from the transmission medium 120. In this manner, a user can easily configure the optical switch matrix 102 to add or remove all or a portion of information from an optical network.

Figure 2:
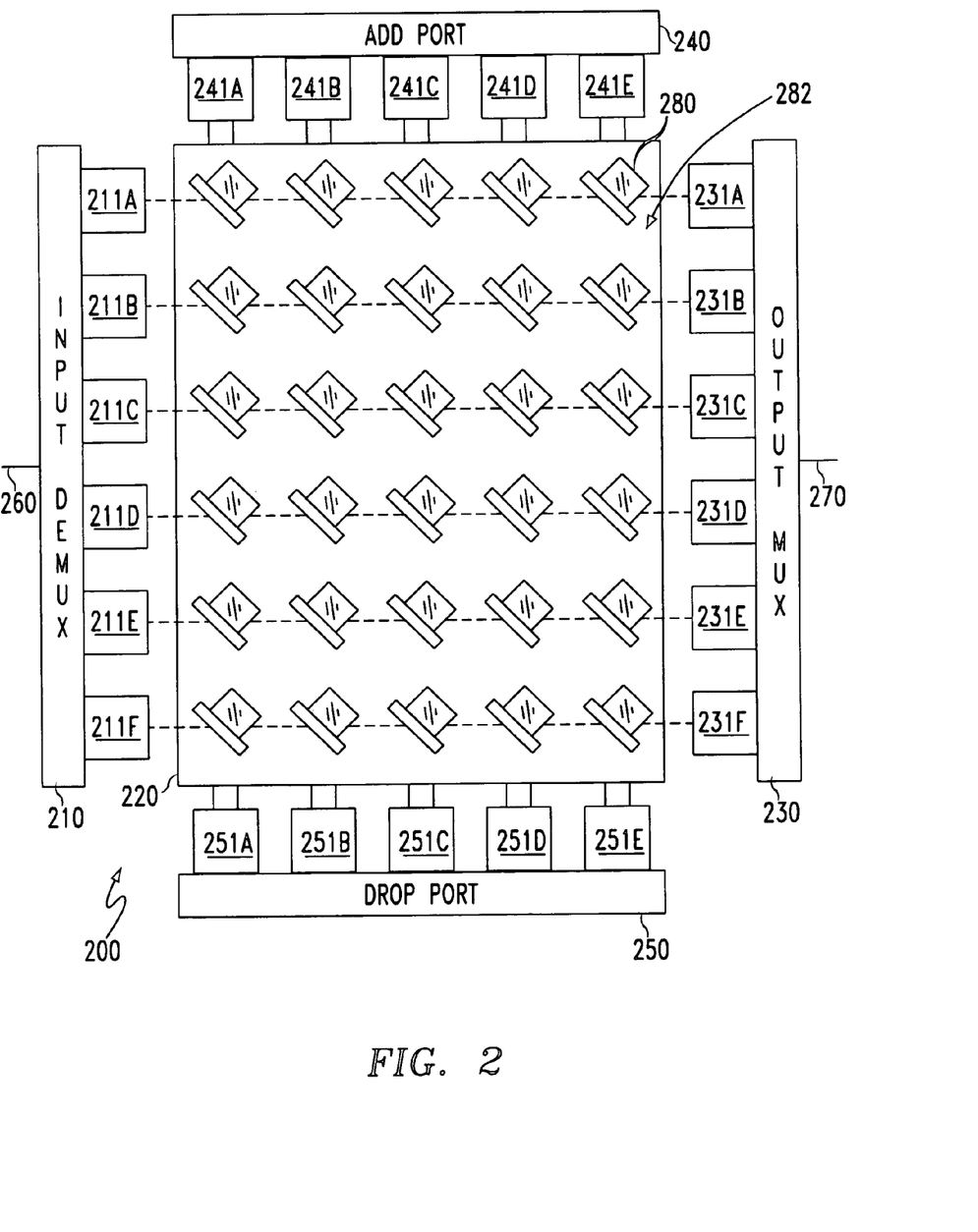
FIG. 2 is an exemplary block diagram of a wavelength add-drop device using MEMS technology in a unidirectional network in accordance with the present invention.

As shown in FIG. 2, the optical switch matrix 102 can be a single microelectrical mechanical system (MEMs). This single MEMs design of the optical switch matrix can be particularly useful for dropping and adding channels from an unidirectional ring network. The MEMs includes an array of micromirrors 280 that are rotatably mounted to a substrate 282. The micromirrors 280 are rotatable between a non-activated and activated position. In the non-activated position, the micromirrors 280 are substantially parallel and flush with the substrate 282. In the active position, the micromirrors 280 are rotated or flipped to be in a substantially perpendicular position relative to the substrate 280. Furthermore, in the active position the micromirrors 280 are positioned within the light path of channels passing through the optical switch matrix.

This type of optical switch matrix is discussed in detail in *Journal of Microelectro-mechanical Systems*, Vol. 5, No. 4, December 1996, entitled "Electrostatic Micro Torsion Mirrors for an Optical Switch Matrix" by Hiroshi Toshiyoshi and Hiroyuki Fujita, incorporated herein by reference in its entirety. The optical switch matrix is also discussed in co-pending and commonly assigned patent application Ser. No. 09/002,240 filed on Dec. 31, 1997, also incorporated herein by reference in its entirety.

As shown in FIG. 2, the wavelength add-drop device 200 includes an optical N×M matrix switch 220 coupled to an input demultiplexer 210, an output multiplexer 230, an add port 240 and a drop port 250.

The optical N×M matrix switch 220 can be a four-port matrix switch. In this embodiment, the optical N×M matrix switch 220 is a N×M free space MEMS crossconnect that comprises N×M micromirrors 280. In the exemplary embodiment shown in FIGS. 2–4, N=6 and M=5. As described above, each of the 30 micromirrors 280 shown in FIGS. 2–4 may take one of an active or inactive position.

Figure 3:
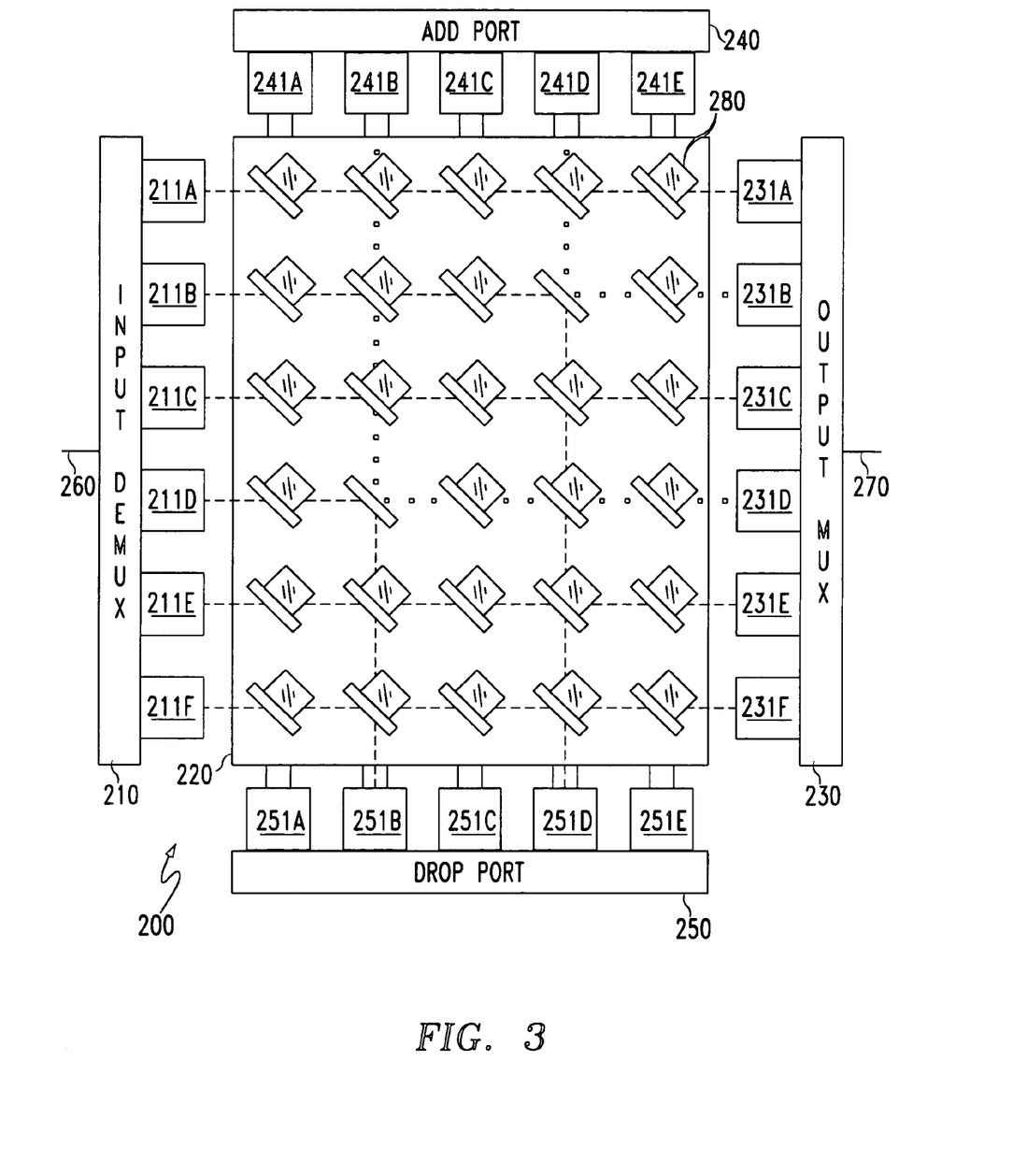
FIGS. 3 and 4 are exemplary block diagrams of the wavelength add-drop device of FIG. 2 in two different functioning configurations.
Figure 4:
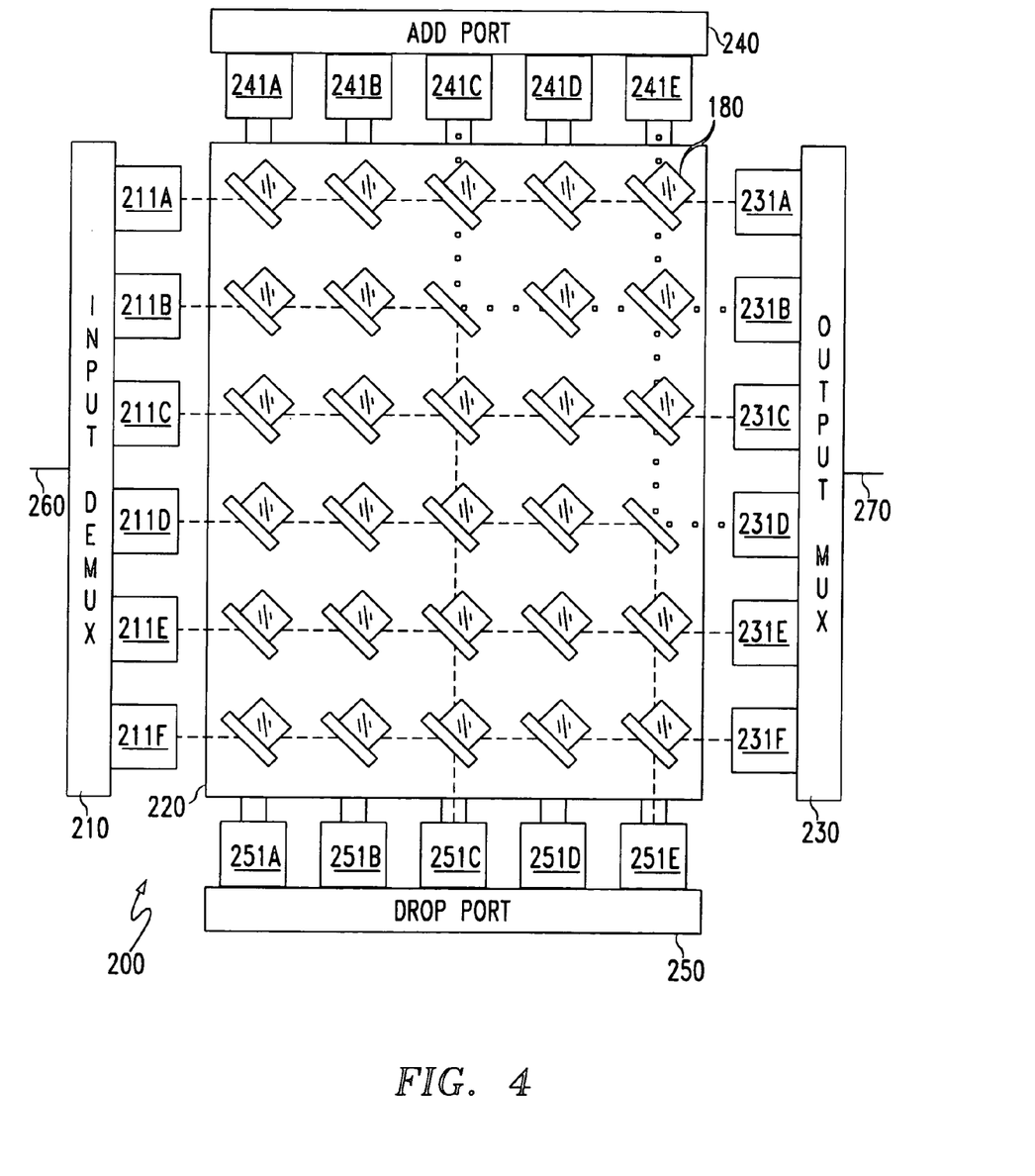

The positions of the micromirrors 280 can be controlled by a matrix controller (not shown in FIGS. 2–4). By energizing the switch that is on the $i^{th}$ row and the $j^{th}$ column of the matrix switch, e.g., by flipping up the micromirror switch on line i and column j, and concurrently tuning the light source of 241j to the wavelength used on the $i^{th}$ line, one can thus add a wavelength from light source 241j and/or drop a wavelength at sensor 251j.

Although the optical switch matrix 102 of FIG. 1 has been described in the exemplary embodiments of FIGS. 2–4 as being a MEMs type switch 220, it is to be understood that various other switches can be used without departing from the spirit and scope of the present invention. For example, the optical switch matrix 102 can be any type of optical switch with or without a micromechanical element, such as optical switches based on total internal reflection of a fluid-containing planar light wave circuit (PLC), otherwise known as bubble technology. Such technology is more fully described in the article entitled "Compact Optical Cross-Connect Switch based on Total Internal Reflection in a Fluid-Containing Planar Light Wave Circuit" by J. E. Fouquet, in 2000 *OFC Technical Digest*, pp. 204 to pp. 206, which is incorporated herein by reference in its entirety.

Referring again to FIG. 2, as an example of operation, assume that in an initial state of operation, all of the micromirrors 280 are in the inactive position. Next, assume that a determination has been made that a signal conveyed by the input line 260 is to be dropped. If so, it is determined on which line of the matrix the light ray that has the wavelength that carries the signal to be dropped is transmitted. Next, the sensor 251A to 251M on which the signal is to be received is determined. The micromirror 280 corresponding to that line and the column of that selected sensor in the matrix is next positioned in the active position. Next, a determination is made whether another signal conveyed by the input line 260 has to be dropped. The above operations are repeated until no other signal conveyed by the input line 260 has to be dropped.

As mentioned above, since the N×M matrix switch in FIG. 2 is implemented in a unidirectional network, the add channels are always associated with the drop channels. That is, the add channel and drop channel on the same column are associated with the same client. By using the backside reflection of the activated micromirrors, and concurrently tuning the lasers of the add channels to selected wavelengths, signals can be added into traffic from the selected add channels.

FIGS. 3 and 4 are exemplary functional block diagrams of the wavelength add-drop device of FIG. 2 in two different functioning configurations corresponding to a same set of dropped light rays in a unidirectional network. In FIGS. 3 and 4, the dropped light rays are the lights rays emitted by input ports 211B and 211D, on the second and fourth lines of switch matrix 220. However, in the configuration outlined in FIG. 3, the light ray transmitted on the second line is dropped to the sensor 251D and the light ray transmitted on the fourth line is dropped to the sensor 251B. In the configuration outlined in FIG. 4, the light ray transmitted on the second line is dropped to the sensor 251C and the light ray transmitted on the fourth line is dropped to the sensor 251E.

Consequently, in the configuration outlined in FIG. 3, the added signals are added by inputting light rays from the light sources 241B and 241D. In the configuration outlined in FIG. 4, the added signals are added by inputting light rays from the light source 241C and 241E.

FIGS. 3 and 4 show that the wavelength add-drop device according to an exemplary embodiment of the invention can be configured to select which sensor 251A–251E receives the dropped signal and to select the light source 241A–241E that inputs the added signal.

The present invention describes a device that offers full client-configurability, permitting any subset of the incoming wavelengths (1, 2, . . . N) to be added or dropped at any subset of the light sources 241A to 241E or sensors 251A to 251E.

Figure 5:
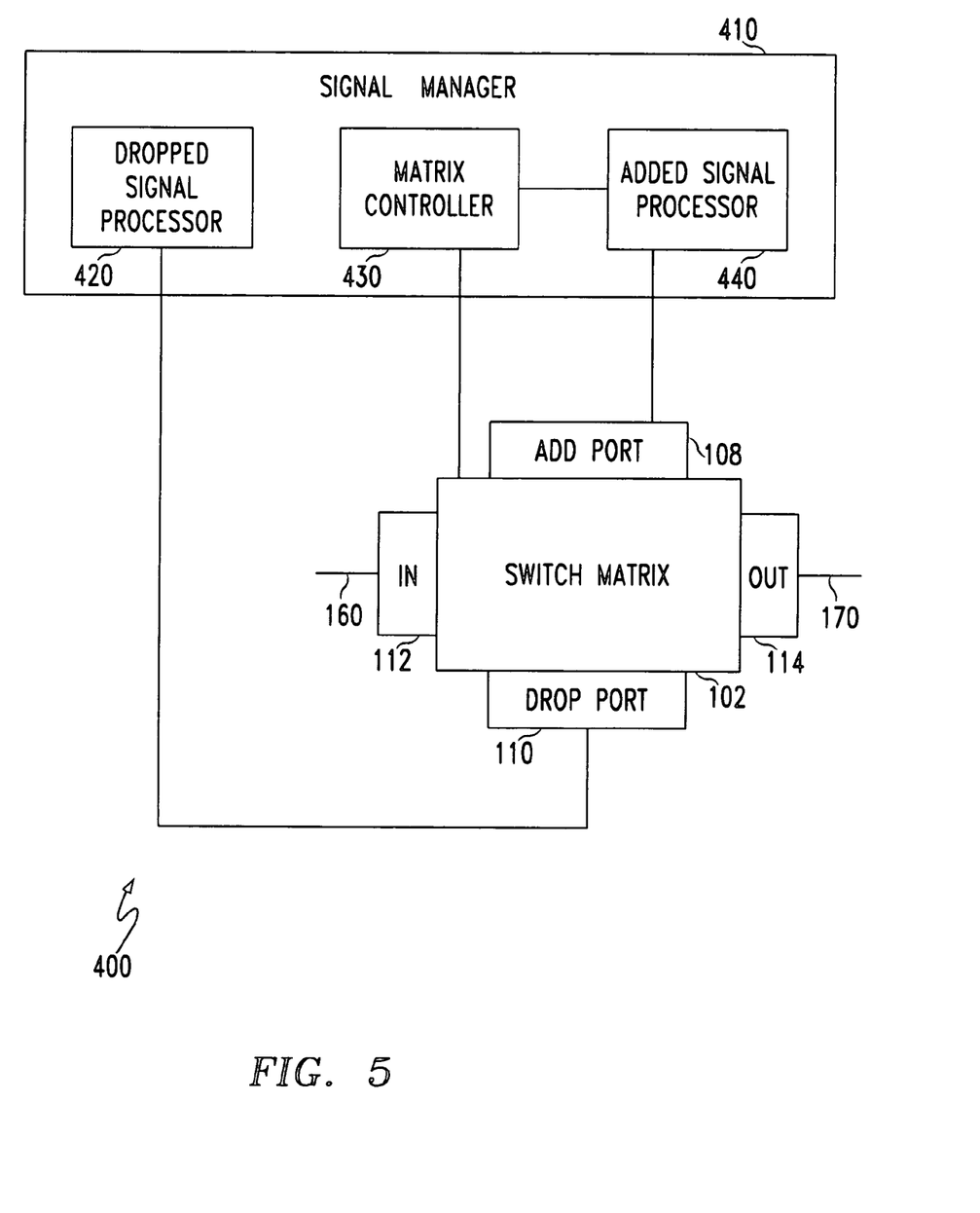
FIG. 5 is an exemplary functional block diagram of a wavelength add-drop device according to an embodiment of the present invention.

An exemplary wavelength add-drop device 400 is outlined in FIG. 5, and includes a signal manager 410, the optical N×M matrix switch 102, the input demultiplexer 112, the output multiplexer 114, the add port 108, the drop port 110, the input line 160 and the output line 170.

The signal manager 410 comprises a dropped signal processor 420, a matrix controller 430 and an added signal processor 440. The dropped signal processor receives the signals output by the dropped channels 110a–110e of the drop port 110 and processes those signals. The matrix controller 430 determines which micromirrors in the optical matrix switch 102 are to be tuned to their active position and commands the positions of the micromirrors. The added signal processor 440 provides the signals to be added through the add port 108 and the light sources 108A–108E.

The signal manager 410, the dropped signal processor 420, the matrix controller 430 and the added signal processor 440 may be, in the exemplary embodiment of the invention shown in FIG. 5, a microprocessor that uses software to implement exemplary embodiments of the methods and devices according to this invention.

Figure 6:
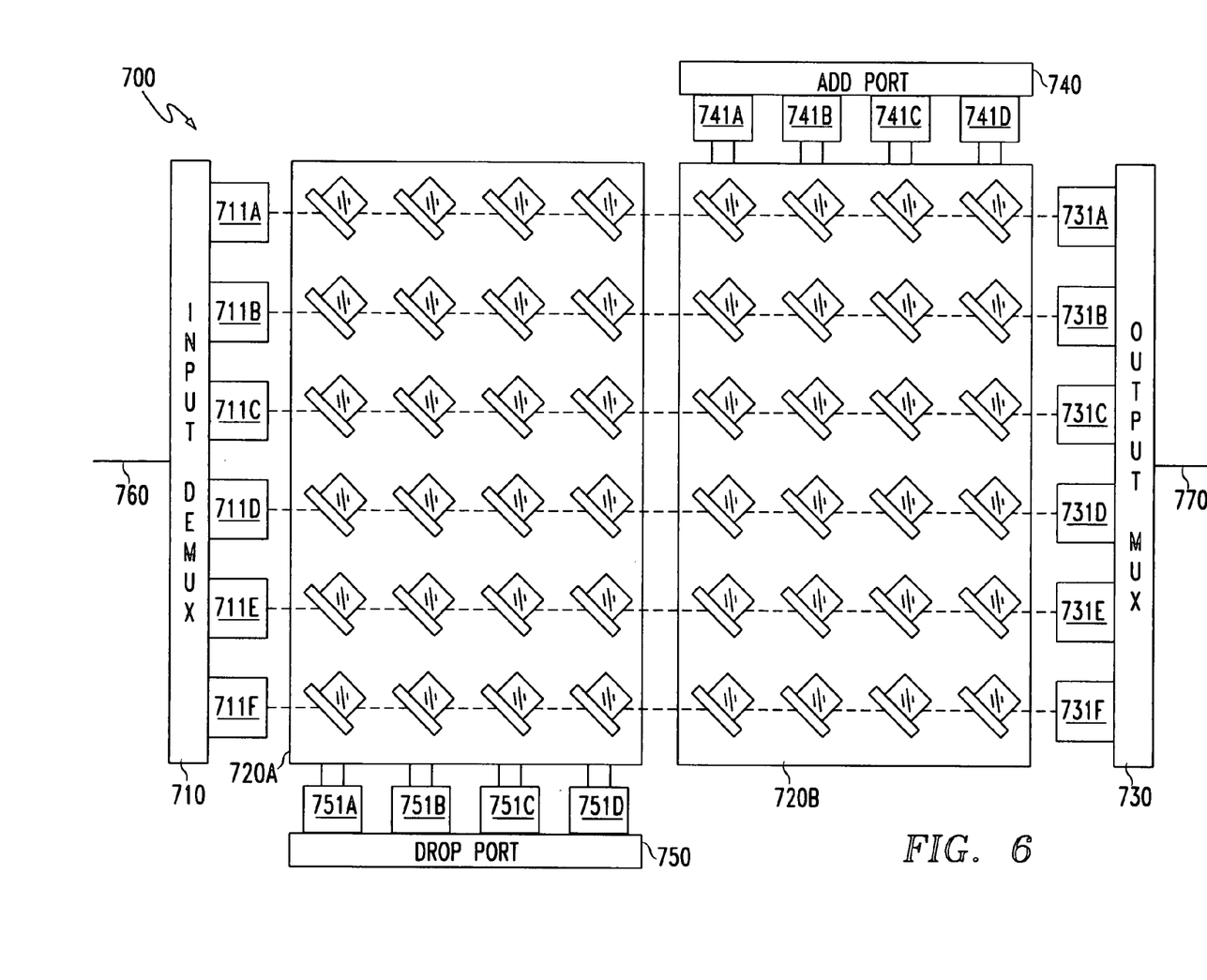
FIGS. 6 and 7 are exemplary functional block diagrams of a wavelength add-drop device using MEMS technology in a bi-directional network in accordance with the present invention.

FIG. 6 shows a wavelength add-drop device 700 wherein the optical switch matrix 102 includes two optical N×M matrix switches 720A and 720B. This configuration of the optical switch matrix 102 having two MEMs can be particularly useful for adding and dropping channels from a bi-directional ring network and/or a linear network. The optical N×M matrix switch 720A is coupled to an input demultiplexer 710, a drop port 750 and the optical N×M matrix switch 720B. The optical N×M matrix switch 720B is also coupled to an output multiplexer 730 and an add port 740.

As described above, the embodiment of the present invention described in FIG. 6 may be used in combination with a linear network or a bi-directional ring. Dropping and adding optical signals may be carried out independently by the optical N×M switch matrices 720A and 720B which provide full client-configurability since the add port and the drop port associated with the same input channel or wavelength are independent of each other.

Figure 7:
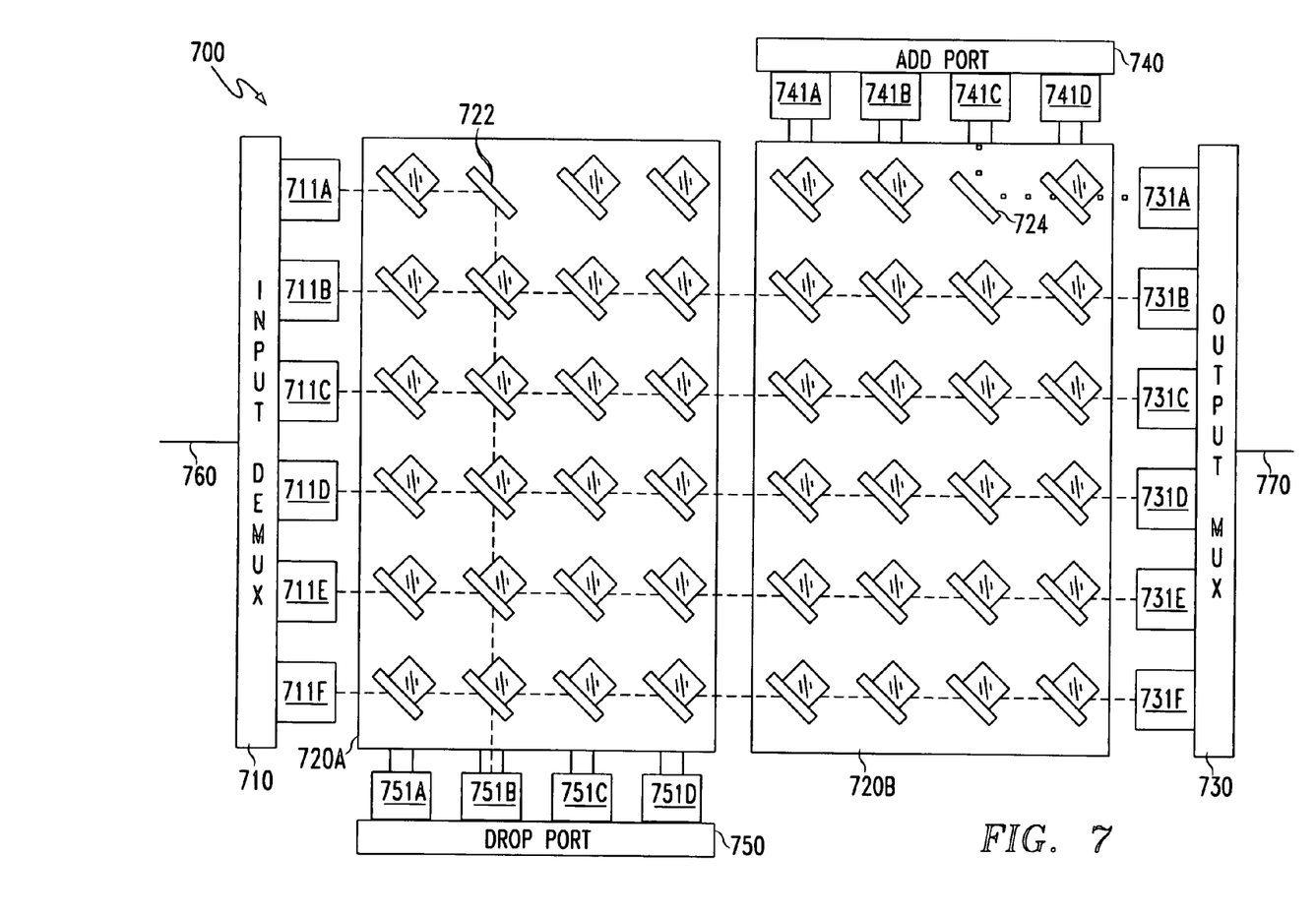

FIG. 7 shows an example of operation of the embodiment described in FIG. 6. In this example, assume that it is desired to replace a channel corresponding to input channel 711A with a new channel corresponding to added channel 741C. As described above, the input channel is received by the demultiplexer 710. The demultiplexer divides the channels into respective input channels 711A–711F that are then input into the optical switch matrix 102.

As can be seen in FIG. 7, the first MEMs 720A of the optical switch matrix 102 receives the input channels. Further, micromirror 722 has now been switched to an active state. Accordingly, the input channel 711A is redirected to a output channel 751B of the drop port 750. Additionally, as can be seen, the remaining input channels 711B–711F are permitted to pass across the first MEMs 720A without interference.

Simultaneous to the dropping of input channel 711A, an input signal 741C is added to the output channel 731A by the add port 740. As can be seen, a micromirror 724 of the second MEMs 720B is switched into an active position. Accordingly, the input signal 741C is redirected to the output port 731A of the output multiplexer 730. Additionally, the output ports 731B–731F receive the input channels 711B–711F, respectively.

The multiplexer 730 then combines the new combination of output channels 731A–731F into an output signal. The output signal is then transmitted across the transmission medium 770. Accordingly, the channel corresponding to input channel 711A has been removed from the transmission medium and the channel corresponding to added channel 741C has been added in the removed channel's place.

It should be noticed that in the embodiment of the present invention outlined in FIG. 6, only one side of the switching mirrors is used. Moreover, the structure shown in FIG. 6 is strictly non-blocking. In other words, a new connection or a connection change can be made without rerouting the existing non-changing connections.

Figure 8:
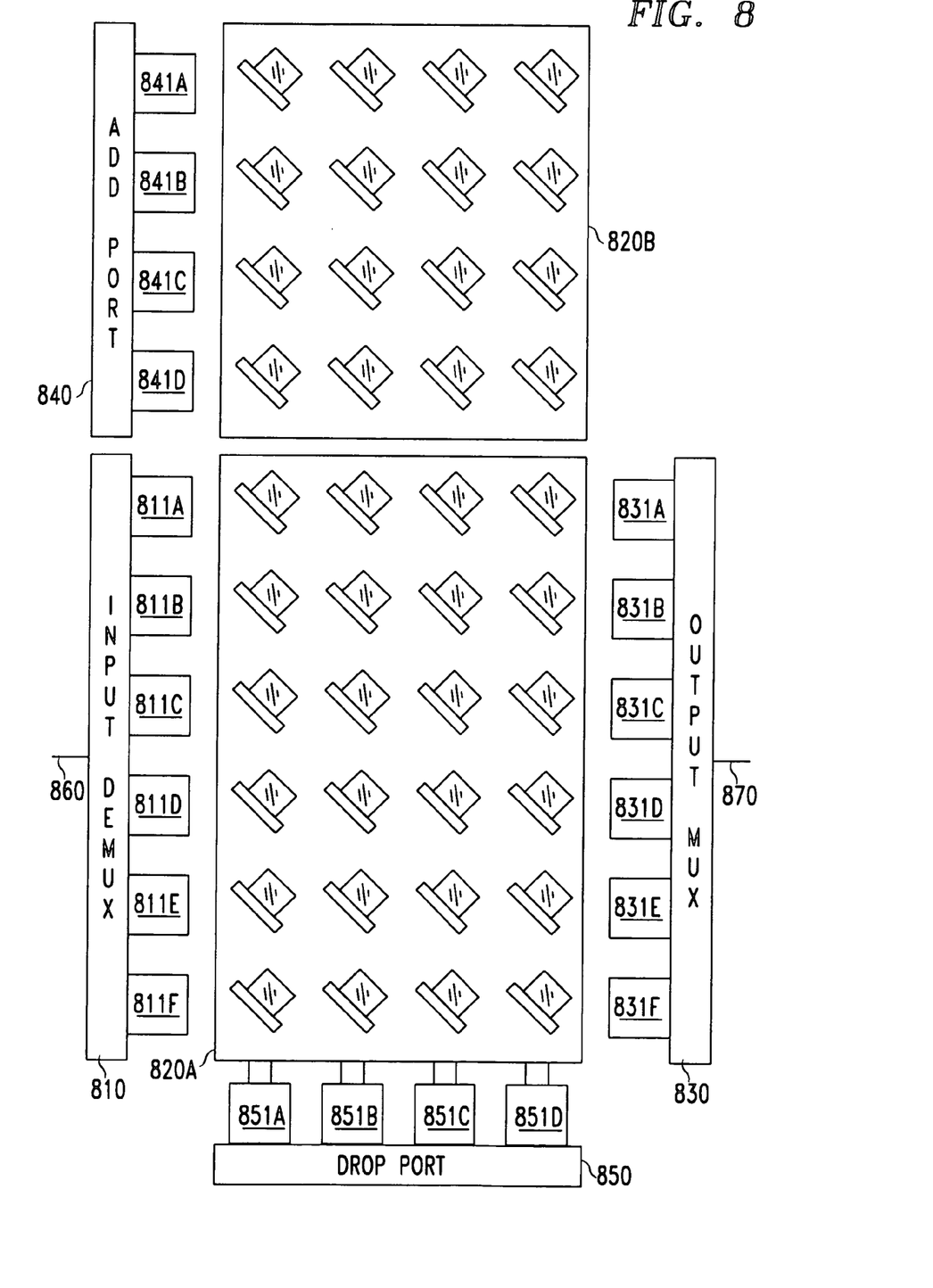
FIGS. 8 and 9 are exemplary functional block diagrams of a wavelength add-drop device using MEMS technology in a bi-directional network in accordance with the present invention.

FIG. 8 shows a wavelength add-drop device wherein the optical switch matrix 102 includes one optical N×M matrix switch 820A and one optical M×M switch 820B. The optical N×M matrix switch 820A is coupled to an input demultiplexer 810, a drop port 850, the optical M×M matrix switch 820B and an output multiplexer 830. The optical M×M matrix switch 820B is coupled to an add port 840.

The embodiment of the present invention described in FIG. 8 may also be used in combination with a linear network or a bi-directional ring network. Dropping and adding optical signals may be carried out independently by the optical matrix switches 820A and 820B which provide full client-configurability sine the add port and the drop port associated with the same input channel or wavelength are independent of each other due to the optical M×M matrix 820B.

Figure 9:
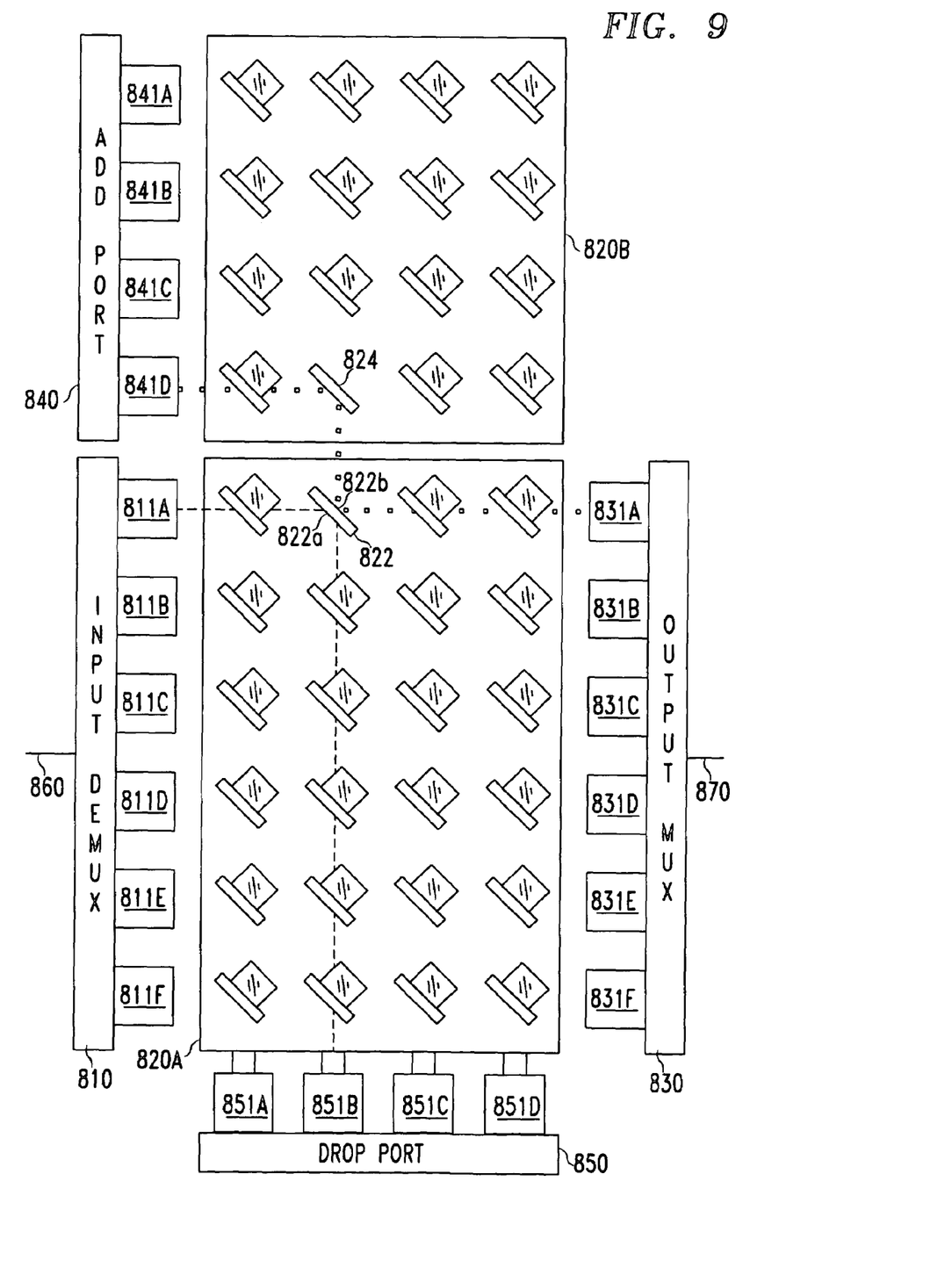

FIG. 9 shows an example of operation of the embodiment described in FIG. 8. In this example, assume that it is desired to replace a channel corresponding to input channel 811A with a new channel, corresponding to the added channel 841D. As described above, the input signal is received by the demultiplexer 810 and separated into input channels 811A–811F. As the input channel 811A is transmitted across the MEMs 820A, the input channel 811A's path is obstructed by micromirror 822 which is in an activated position. A front side 822a of micromirror 822 causes the input channel 811A to be redirected to drop channel 851B.

Additionally, as the input channel 811A is being dropped, the added channel 841D is being added. The added channel originates from the add port 840 and is transmitted across the MEMs 820B until it is redirected by activated micromirror 824. The micromirror 824 redirects the added channel 841D so that it intersects with an opposite side 822b of the micromirror 822. The opposite side 822b of the reflecting mirror 822 redirects the channel 841D to the output channel 831A of the multiplexer 830.

As can be seen from the example described above, the input channels 811B–811F will be transmitted across the MEMs 820A and be received by the corresponding output channels 831B–831F. The input channel 811A will be dropped to the drop port 851B, while the added channel 841D will be transmitted to the output port 831A. Accordingly, the output multiplexer 830 will combine the individual channels into an output signal and transmit it across the transmission medium 870.

It should be appreciated that, in the embodiment of the present invention outlined in FIGS. 8 and 9, two sides of the switching mirrors of the optical N×M switch matrix 820A are used but only one side of the switching mirrors of the optical M×M switch matrix 820B are used. Moreover, the structure shown in FIGS. 8 and 9 is strictly non-blocking. A new connection or a connection change can be made without rerouting the existing non-changing connections.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. An optical switching device, comprising:
an optical switch matrix having one or more optical switches that are capable of redirecting optical channels passing through the matrix;
an input port coupled to the optical switch matrix adapted to receive input channels and to transmit them to the optical switch matrix, the input channels being at respective different wavelengths;
an output port coupled to the optical switch matrix adapted to receive output channels from the optical switch matrix;
an add port coupled to the optical switch matrix adapted to transmit add channels to the optical switch matrix; and
a drop port coupled to the optical switch matrix adapted to receive dropped channels from the optical switch matrix;
wherein the switches of the optical switch matrix can be selectively configured so that at least one of the input channels is directed to the drop port and at least one of the add channels is directed to the output port in place of the at least one input channel,
wherein each add channel can be tuned to the wavelengths of any of the input channels so that the at least one add channel can be directed to the output port in place of any particular one of the input channels at that particular channel's wavelength,
wherein the optical switch matrix includes a first array of switches and a second array of switches,
and wherein the first array of switches is an N×M array of switches, the second array of switches is an M×M array of switches, the add port is coupled to the second array of switches and the input port, output port, and drop port are coupled to the first array of switches.

2. The optical switching device of claim 1 wherein the optical switch matrix is a microelectrical mechanical system having an array of micromirrors arranged on a substrate.

3. The optical switching device of claim 2 wherein an input channel is re-directed to a drop port by a front surface of a first micromirror of the first array of switches, and an add channel is redirected to an output port by a front surface of the second array of switches and a back surface of the first micromirror of the first array of switches.

* * * * *